United States Patent
Nomura (10) Patent No.: US 8,396,652 B2
(45) Date of Patent: Mar. 12, 2013

(54) MAP DATA PROVIDING METHOD

(75) Inventor: Takashi Nomura, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 452 days.

(21) Appl. No.: 11/629,208

(22) PCT Filed: Mar. 31, 2005

(86) PCT No.: PCT/JP2005/006329
§ 371 (c)(1),
(2), (4) Date: Dec. 12, 2006

(87) PCT Pub. No.: WO2005/124724
PCT Pub. Date: Dec. 29, 2005

(65) Prior Publication Data
US 2008/0015770 A1    Jan. 17, 2008

(30) Foreign Application Priority Data
Jun. 15, 2004    (JP) .................... 2004-176684

(51) Int. Cl.
*G01C 21/00* (2006.01)
(52) U.S. Cl. .......... 701/200; 340/988; 340/995.1; 340/995.11; 340/995.14; 340/995.15; 340/995.18; 701/400; 701/409; 701/450; 701/451; 701/452; 701/453; 701/455; 701/461; 701/468
(58) Field of Classification Search ............ 340/990, 340/995.1, 995.11; 701/117–119, 200–209; 353/11, 12; 434/147, 150, 153
See application file for complete search history.

(56) References Cited

U.S. PATENT DOCUMENTS

| | | | |
|---|---|---|---|
| 5,473,324 A * | 12/1995 | Ueno ............................ 340/990 |
| 5,793,310 A * | 8/1998 | Watanabe et al. ......... 340/995.14 |
| 6,023,655 A * | 2/2000 | Nomura ......................... 701/532 |
| 6,061,618 A * | 5/2000 | Hale et al. ....................... 701/50 |
| 6,233,521 B1 * | 5/2001 | Nomura ......................... 701/409 |
| 6,473,691 B1 * | 10/2002 | Winter et al. .................. 701/532 |
| 6,546,334 B1 * | 4/2003 | Fukuchi et al. ................ 701/532 |
| 6,559,853 B1 * | 5/2003 | Hashimoto et al. ........... 345/582 |

(Continued)

FOREIGN PATENT DOCUMENTS

| CN | 1313503 A | 9/2001 |
|---|---|---|
| CN | 1441228 A | 9/2003 |

(Continued)

OTHER PUBLICATIONS

English translation of International Search Report dated Jul. 12, 2005 (Two (2) pages).

(Continued)

*Primary Examiner* — Jonathan M Dager
(74) *Attorney, Agent, or Firm* — Crowell & Moring LLP (57) ABSTRACT

A map data providing method for providing map data to be used in a navigation system includes: dividing an area over which the map data are available into a plurality of blocks by using each of a plurality of division patterns set so that blocks resulting from divisions with the plurality of division patterns are not identical to one another; generating map data in correspondence to each of the blocks resulting from the divisions achieved with the plurality of division patterns; and providing the map data corresponding to the individual blocks resulting from the divisions achieved with the plurality of division patterns to a user so as to allow the user to freely select map data corresponding to any block.

10 Claims, 7 Drawing Sheets

U.S. PATENT DOCUMENTS

| | | | |
|---|---|---|---|
| 6,782,319 B1* | 8/2004 | McDonough | 701/532 |
| 7,082,443 B1* | 7/2006 | Ashby | 342/357.41 |
| 7,259,760 B1* | 8/2007 | Hashimoto et al. | 345/419 |
| 2001/0038612 A1* | 11/2001 | Vaughn et al. | 370/256 |
| 2002/0103781 A1* | 8/2002 | Mori et al. | 707/1 |
| 2002/0116121 A1* | 8/2002 | Ruiz et al. | 701/208 |
| 2003/0028313 A1* | 2/2003 | Nagamune et al. | 701/202 |
| 2003/0028315 A1* | 2/2003 | Miyahara | 701/208 |
| 2003/0040868 A1* | 2/2003 | Fish et al. | 701/213 |
| 2003/0045997 A1* | 3/2003 | Nakane et al. | 701/202 |
| 2003/0060974 A1* | 3/2003 | Miyahara et al. | 701/209 |
| 2004/0012506 A1* | 1/2004 | Fujiwara et al. | 340/995.1 |
| 2004/0073361 A1* | 4/2004 | Tzamaloukas et al. | 701/210 |
| 2004/0198395 A1* | 10/2004 | Kimoto et al. | 455/456.1 |
| 2004/0257340 A1* | 12/2004 | Jawerth | 345/157 |
| 2005/0043880 A1* | 2/2005 | Yamane et al. | 701/200 |
| 2006/0004515 A1* | 1/2006 | McDonough | 701/208 |
| 2007/0096945 A1* | 5/2007 | Rasmussen et al. | 340/995.1 |
| 2007/0168888 A1* | 7/2007 | Jawerth | 715/857 |

FOREIGN PATENT DOCUMENTS

| | | |
|---|---|---|
| JP | 8-292716 A | 11/1996 |
| JP | 11-65430 A | 3/1999 |
| JP | 2001-272241 A | 10/2001 |
| JP | 2002-267459 A | 9/2002 |
| JP | 2003-114613 A | 4/2003 |
| JP | 2003-288459 A | 10/2003 |
| JP | 2003-315061 A | 11/2003 |

OTHER PUBLICATIONS

Translation of the German Office Action dated Jul. 14, 2008 (two (2) pages).

Topographic map 1:500000; Ammersee Starnberger See und Umgebung (Lakes Ammersee Starnberger See and surrounding area); Bayerisches Landesvermessungsamt Muenchen (Bavarian Office of Land Survey Munich); ISBN 3-86038-004-4; 1994 edition; cover sheet and caption, (two (2) pages).

Topographic map 1:500000; Starnberger See und Umgebung; (Lake Starnberg and surrounding area), Bayerisches Landesvermessungsamt Muenchen; 1985 edition; cover sheet and detail "map base", (two (2) pages).

Office Action in Chinese Application No. 2011012500617160 dated Jan. 28, 2011.

Office Action in Chinese Application No. 200580019489.6 dated Jan. 28, 2011.

\* cited by examiner

MAP DATA PROVIDING METHOD

TECHNICAL FIELD

The present invention relates to a method for providing map data to be used in a navigation system.

BACKGROUND ART

There are navigation systems known in the related art that execute navigation operations by using map data recorded in recording media such as CD-ROM (see, for instance, patent reference literature 1). Such map data provided in recording media may be made available in separate versions each corresponding to a specific region, e.g., a Kanto region version, a Chubu region version and a Kinki region version.
Patent reference literature 1: Japanese Laid Open Patent Publication No. H8-292716

DISCLOSURE OF THE INVENTION

Problems to be Solved by the Invention

It is safe to assume that the user of a navigation system generally uses his navigation system while driving in the area where he lives. If the user's residence is located near the boundary of two regions, his daily life may be carried on over the two regions. Under such circumstances, if the map data are provided in separate versions, each corresponding to a specific region such as the Kanto region or the Chubu region, the user of the navigation system will be required to purchase two versions of map data corresponding to the adjacent regions.

A problem thus arises in that some users will have to incur considerable extra cost. There is another problem in that the recording medium that is currently loaded will have to be replaced by the other recording medium whenever necessary. While map data are sometimes provided in a single nationwide version, such map data are also bound to be costly. Furthermore, the nationwide version map data are not likely to include detailed information.

Means for Solving the Problems

According to the 1st aspect of the invention, a map data providing method for providing map data to be used in a navigation system comprises: dividing an area over which the map data are available into a plurality of blocks by using each of a plurality of division patterns set so that blocks resulting from divisions with the plurality of division patterns are not identical to one another; generating map data in correspondence to each of the blocks resulting from the divisions achieved with the plurality of division patterns; and providing the map data corresponding to the individual blocks resulting from the divisions achieved with the plurality of division patterns to a user so as to allow the user to freely select map data corresponding to any block.

According to the 2nd aspect of the invention, in the map data providing method according to the 1st aspect, it is preferred that the blocks resulting from the divisions achieved with the plurality of division patterns are determined by taking into consideration connections related to everyday life activities.

According to the 3rd aspect of the invention, in the map data providing method according to the 1st aspect, it is preferred that the blocks resulting from the divisions achieved with the plurality of division patterns are determined by taking into consideration a vehicular traffic volume.

According to the 4th aspect of the invention, in the map data providing method according to the 1st aspect, it is preferred that sizes of the blocks resulting from the divisions achieved with the plurality of division patterns are determined by taking into consideration ranges over which users of the navigation system typically travel as part of daily routines.

According to the 5th aspect of the invention, in the map data providing method according to the 1st aspect, it is preferred that the plurality of division patterns include a first division pattern with which a first block centered on a first major city is defined and a second division pattern with which a block centered on a second major city, present in the first block closer to a boundary of the first block, is defined.

According to the 6th aspect of the invention, in the map data providing method according to any of the 1st through 5th aspects, it is preferred that the map data corresponding to the individual blocks resulting from the divisions achieved with the plurality of division patterns are stored and provided in separate recording media.

According to the 7th aspect of the invention, in the map data providing method according to any of the 1st through 5th aspects, it is preferred that the map data corresponding to the individual blocks resulting from the divisions achieved with the plurality of division patterns are separately provided to the navigation system via a communication line.

According to the 8th aspect of the invention, in the map data providing method according to any of the 1st through 7th aspects, it is preferred that the map data provided in correspondence to the individual blocks resulting from the divisions achieved with the plurality of division patterns are updated in units of the individual blocks in which the map data are initially provided.

According to the 9th aspect of the invention, a map data providing apparatus executes a map data providing method according to any of the 1st through 8th aspects.

Effect of the Invention

The present invention, adopting the structure described above, achieves the following advantages.

When dividing an area over which the map data are to be provided, a plurality of division patterns each dividing the area into a plurality of blocks not identical to a plurality of blocks into which the area is divided by using another division pattern, are used. As a result, the user of the navigation system is able to select the optimal map data corresponding to a specific block that best suits his expected requirements. This, in turn, allows him to obtain the minimum amount of map data while still satisfying his requirements, at low cost.

BRIEF DESCRIPTION OF THE DRAWINGS (FIG. 1) An update system through which map data used in a navigation system are updated;

(FIG. 7) An illustration showing how the program may be provided to a personal computer via a recording medium such as a CD-ROM or via a data signal on the Internet or the like;

BEST MODE FOR CARRYING OUT THE INVENTION

—Structure of Map Data Providing System—

Figure 1:
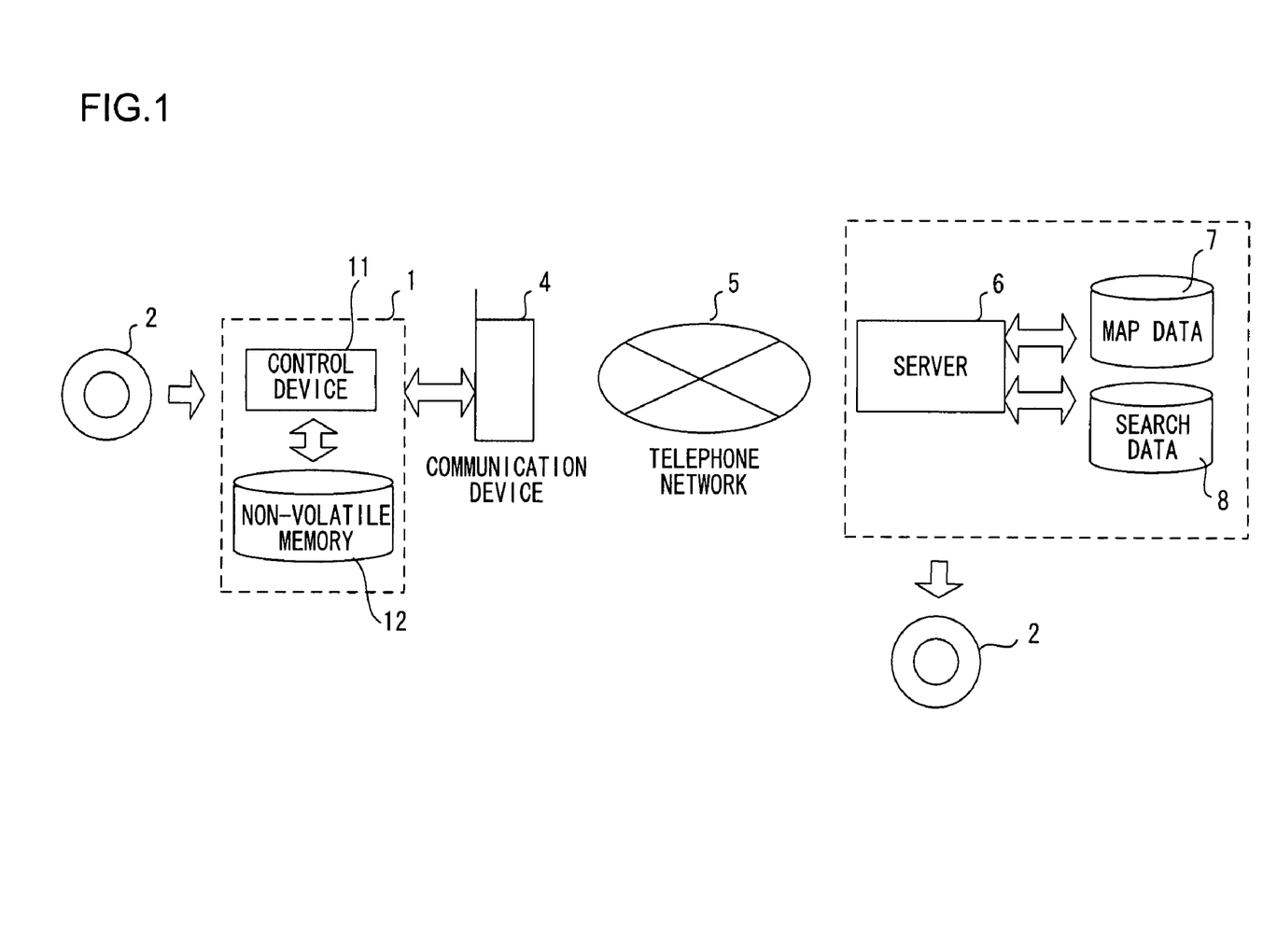

FIG. 1 shows the map data providing system achieved in an embodiment. An on-vehicle navigation system 1 reads map data, search data (guidance search data) and the like from a recording medium 2 such as a CD-ROM or a DVD-ROM. A server 6 at a data providing center 9 reads map data and search data from a map database 7 and a search database 8 respectively and provides the map data and the search data thus read to the navigation system via the recording medium 2.

The map database 7 and the search database 8 at the data providing center 9 are mother databases at which all the versions of map data and search data, from the oldest to the latest, are stored. The server 6 provides the recording medium 2 having contained therein map data, search data or the like by using the map database 7 or the search database 8.

While the recording medium 2 is provided by the server 6 in the description above, the server 6 in reality provides master data of the map data to be stored into the recording medium 2 to a recording medium manufacturing plant (not shown). At the recording medium manufacturing plant, the recording medium 2 is manufactured by using the master data provided thereto, and the recording medium thus manufactured is then provided to the user of the navigation system 1 via a car dealer or the like.

The navigation system 1 can be connected to a communication device 4 such as a portable telephone. The navigation system 1 can be further connected to a telephone network 5 via the communication device 4 and then to the server 6 via the telephone network 5. Thus, the server 6 at the data providing center 9 is also able to provide map data or search data through a communication line such as the telephone network 5. In addition, the server 6 is able to provide to the navigation system 1 update data to be used to partially update the existing map data or search data held at the navigation system 1 via the telephone network 5. The portable telephone 4 is wirelessly connected to the telephone network 5.

The navigation system 1 includes a control device 11 and a nonvolatile memory 12. The control device 11 is constituted with a microprocessor and its peripheral circuits. The nonvolatile memory 12 is a hard disk, a flash memory or the like installed in the navigation system 1. The nonvolatile memory 12 may be any type of storage device as long as data written therein are not lost when the power to the navigation system 1 is turned off.

Figure 2:
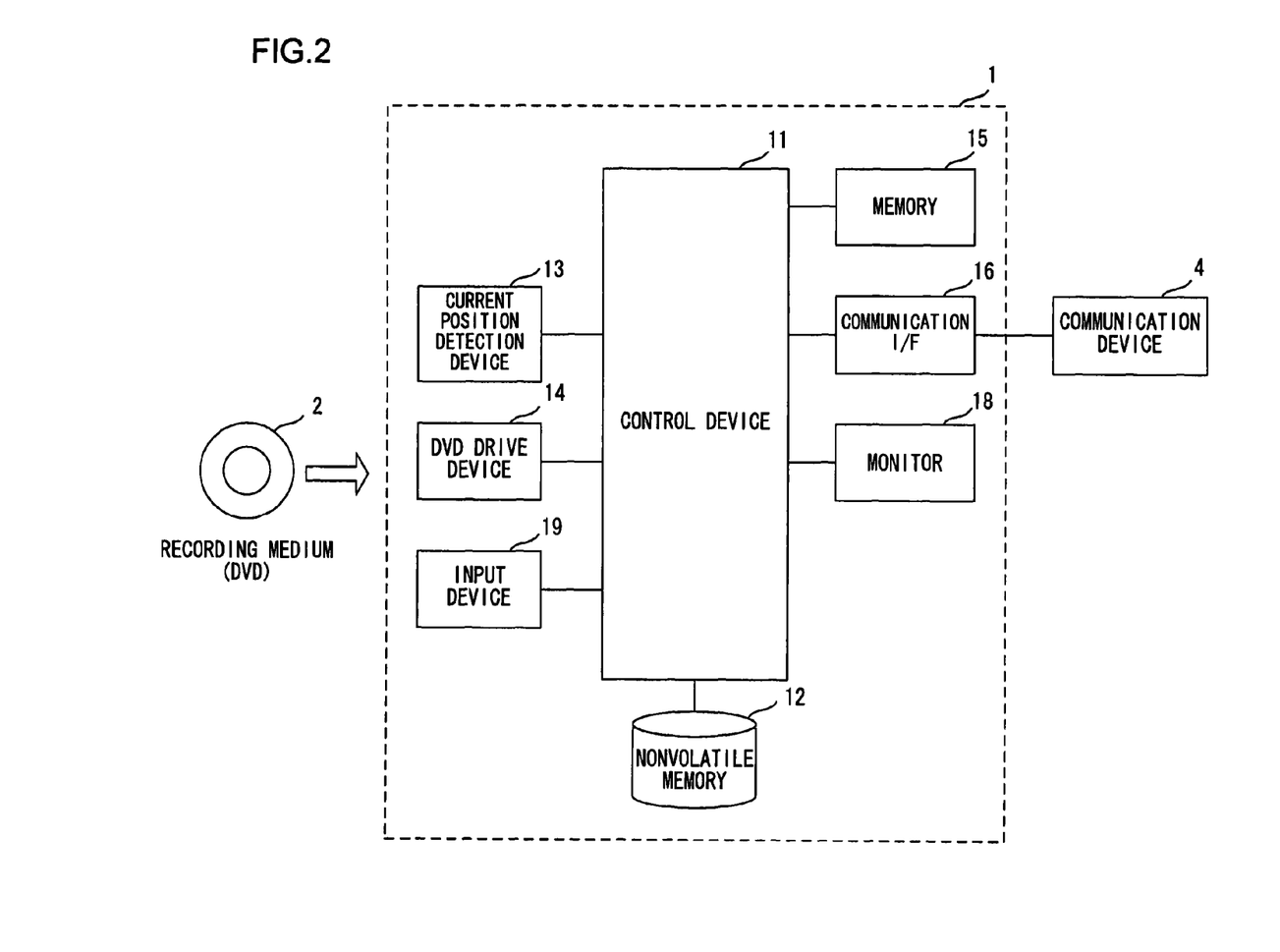
(FIG. 2) A block diagram of an on-vehicle navigation system.

FIG. 2 is a block diagram of the on-vehicle navigation system 1. The navigation system 1 comprises the control device 11, the nonvolatile memory 12, a current position detection device 13, a DVD drive device 14, a memory 15, a communication interface 16, an input device 17, a monitor 18 and the like.

The current position detection device 13, which detects the current position of the vehicle, may be constituted with, for instance, an azimuth sensor that detects the advancing azimuth of the vehicle, a vehicle speed sensor that detects the vehicle speed, a GPS sensor that detects a GPS signal transmitted from a GPS (global positioning system) satellite and the like. The DVD drive device 14 reads map data and the like from the recording medium 2 loaded therein. The recording medium 2 used in the embodiment is a DVD-ROM. However, another type of recording medium such as a CD-ROM may be used.

The memory 15 is used to store the vehicle position information detected with the current position detection device 13 and the like and also to store node information, link information and the like of the nodes and the links on a recommended route calculated by the control device 11. The memory 15 constitutes a working area of the control device 11. The connection with the communication device 4 is achieved via the communication interface 16. The use of a portable telephone and Internet connection are enabled via the communication interface 16.

The monitor 18 is a display device at which various types of information including a map and the recommended route are displayed. The monitor 18 may constitute an integrated part of the navigation system main unit, or it may be provided in a separate casing. Furthermore, the monitor 18, connected with the navigation system main unit via a cable or the like, may be installed as a standalone unit at a remote position. A destination for the vehicle and the like are input via the input device 17 when searching for a route. It is also used to enter a search key. The input device may be a remote-control unit or it may be constituted with a touch panel or the like disposed over the screen of the monitor 18.

The control device 11 executes various types of navigation processing such as road map display, route calculation (route search) and route guidance by using the current vehicle position information detected with the current position detection device 13, the map data and the search data stored in the recording medium 2 or the nonvolatile memory 12. It is to be noted that a program of the various types of processing executed by the control device 11 is installed in a ROM (not shown) built into the control device 11.

The server 6 at the data providing center 9 is a computer system that executes various types of processing, including generation of map data or search data to be provided in the recording medium 2 or via the telephone network 5, by using the map database 7 and the search database 8. The computer system at the server 6 may be constituted with any of various types of computers including a general-purpose computer, a workstation and a personal computer.

Next, the map data and the search data used in the navigation system 1 are explained.

—Map Data—

The map data are information related to maps and include background (map display) data, road (locator) data, route search data (network data) and route guidance data (information indicating intersection names, road names and directional terms, directional guidance facility information and the like). The background data are used to display a background of a road or a background in a road map. The road data are used to specify the position (current position) of the vehicle on a road for map matching and the like. The route search data, which are data constituted with branching information and the like not directly relevant to the specific road shapes, are mainly used when calculating the recommended route (when executing a route search). The route guidance data include the names of intersections and the like, and are used to provide guidance for the driver or the like along the recommended route having been calculated.

The road data (locator data) are link string data that express roads with links, nodes and link strings. A node may be an intersection or a special point specified on a road. A link is equivalent to a road segment connecting nodes, whereas a link string is a string of a plurality of links representing a single road. The details of the link string data are of the known art. The background data may be, for instance, polygon or poly-line data. Roads are displayed by using poly-line data or the like.

The map data in the embodiment are provided as data files each created in correspondence to a specific region among regions into which the map data are divided by using division patterns to be detailed later, and are managed in units of individual data files.

—Search Data—

The search data are used to determine a desired geographical point through a search instead of setting the geographical point on the map. For instance, when setting a destination for a route search, the position of the destination facility is ascertained by using the search data, i.e., by entering the name, the telephone number, the street address or the like of the facility. The control device 11 sets the geographical point thus ascertained by using the search data as, for instance, the destination and executes processing such as a route search.

The search data include different types of data, such as name (phonetic) search data, telephone number search data and street address search data. The name search data are used to identify a specific position on the map in correspondence to the name of a facility present thereat, and data files for each category (genre) are created each in correspondence to one of the regions to be detailed later. The categories include, for instance, "stations", "airports", "ferries", "department stores" and "hotels". Each file contains search tree data and substance data that enable name-based search.

The telephone number search data are used to locate a position on the map based upon the telephone number, and data files are prepared each in correspondence to a specific region, to be detailed later. Each file contains search tree data and substance data that can be searched by telephone number. The street address search data are used to locate a position on the map in correspondence to the street address, and data files are prepared each in correspondence to a specific region to be detailed later. Each file contains search tree data and substance data that can be searched by street address. The substance data in the various types of search data described above include data such as facility name information, telephone number information, street address information and position information. It is to be noted that the position information in the search data is constituted with positional coordinate data indicating specific positional coordinates such as latitudinal/longitudinal coordinates.

—Providing Map Data—

Figure 3:
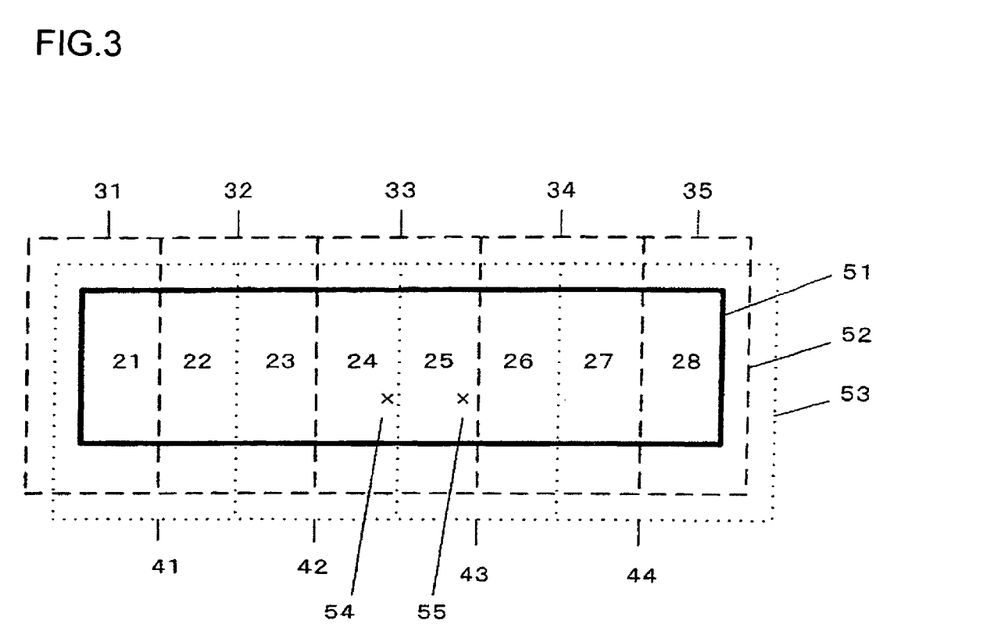
(FIG. 3) The concept of map data division adopted in an embodiment.

Next, the map data providing method characterizing the embodiment is explained. FIG. 3 illustrates the concept of the map data division adopted in the embodiment. FIG. 3 shows an entire map area 51 over which the map data are available, divided by using two division patterns 52 and 53. The entire map area 51 over which the map data are available may be, for instance, the entire nation of Japan. With the division pattern 52, the entire map area 51 is divided into five regions, from a region 31 to a region 35. With the division pattern 53, the entire map area 51 is divided into four regions, a region 41 to a region 44. These regions may be alternatively referred to as blocks into which the entire map area 51 is divided.

The division patterns are set so that the regions into which the entire map area is divided by using the division pattern 52 and the regions into which the entire map area is divided by using the division pattern 53 are not identical. For instance, the region 32 includes an area 22 and an area 23, and the region 33 includes an area 24 and an area 25. The region 42 includes the area 23 and the area 24 and the region 43 includes the area 25 and an area 26. It is assumed that the areas at the boundary between each pair of adjacent regions among the regions into which the entire map area is divided by using a given division pattern do not overlap, i.e., the map data do not overlap at the boundary, so as to minimize the map data volume.

Map data are generated in correspondence to each of the regions into which the entire map area is divided by using the plurality of division patterns 52 and 53. The map data for the individual regions are individually stored and provided in separate recording media so that the user of the navigation system 1 is able to freely select the map data he requires. In the embodiment, five recording media, each corresponding to one of the regions 31 through 35 and four recording media each corresponding to one of the regions 41 through 44 are provided. The user of the navigation system 1 is thus able to select any region the map data of which he requires and purchase the recording medium having stored therein the map data for the region.

The embodiment, in which the entire map area 51 is divided by using two division patterns 52 and 53 and map data are provided in correspondence to the individual regions resulting from the division, achieves the following advantages. For instance, a user 54 residing in an area near the boundary between the area 24 and the area 25 only needs to purchase the map data for the region 33 resulting from the division with the division pattern 52. A user 55 residing in the region 33 further toward the boundary between the area 25 and the area 26, on the other hand, only needs to purchase the map data for the region 43 resulting from the division with the division pattern 53.

Taking into consideration the likely daily activities of the user 55, he would need to acquire the map data for the region 33 and the map data for the region 34 if the map data were provided only in units of blocks resulting from the division with the division pattern 52. However, the embodiment in which the map data are provided in units of blocks resulting from divisions with a plurality of division patterns allows the user 55 to simply purchase the map data for the region 43 resulting from the division with the division pattern 53 which is different from the division pattern 52 used to divide the entire map area into blocks, one of which is purchased by the user 54.

As a result, the user 55 is able to obtain the map data he needs at lower cost. In addition, he does not need to perform the tedious task of having to frequently switch recording media while driving the vehicle to run daily errands. It is to be noted that the user 54 or the user 55, needing map data for a region further away, only needs to add in sequence the map data for the remote region resulting from the initial division pattern.

Figure 4:
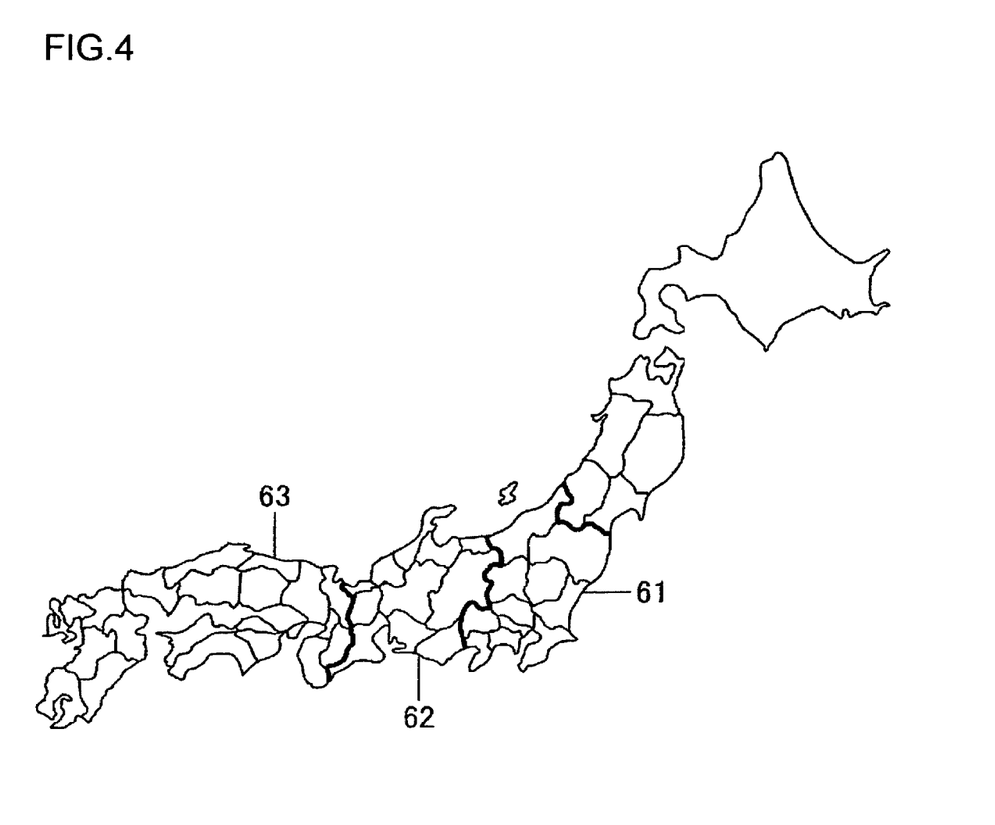
(FIG. 4) An example of a division pattern.
Figure 5:
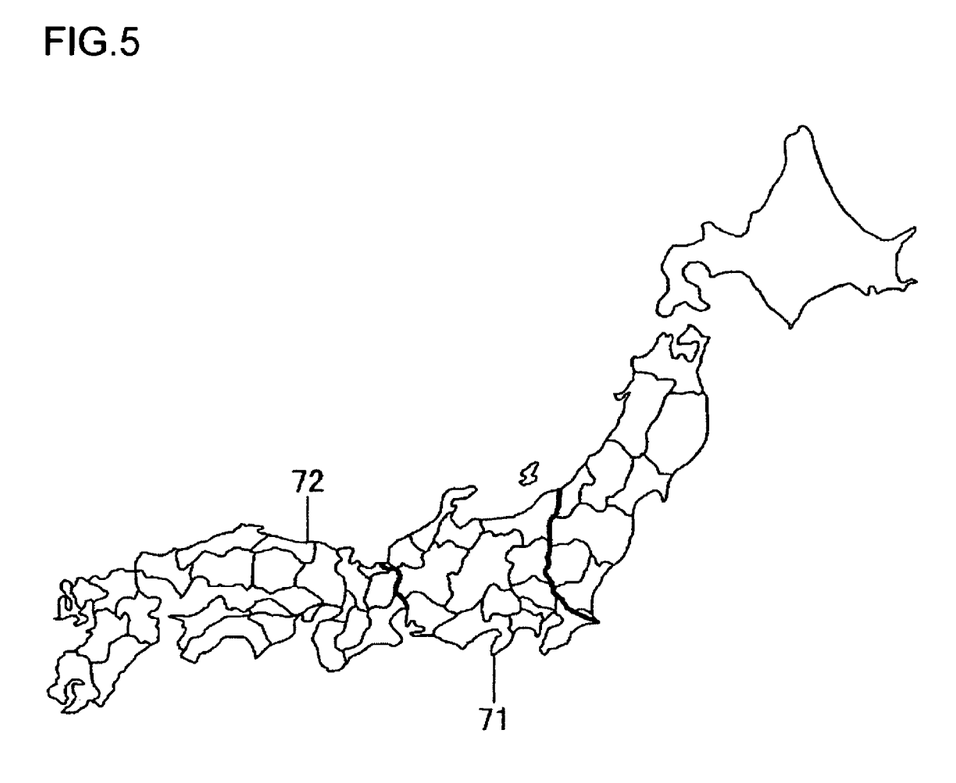
(FIG. 5) An example of a division pattern.

FIGS. 4 and 5 each present an example of one of the plurality of division patterns. The division pattern in FIG. 4 includes a region 61 centered on Tokyo, a region 62 centered on Nagoya city and a region 63 centered on Kobe city. The division pattern in FIG. 5 includes a region 71 centered on Shizuoka city and a region 72 centered on Osaka city.

For instance, a user residing in the Tokyo area only needs to select the map data divided by using the division pattern in FIG. 4 and purchase the map data for the region 61. A user residing in the Shizuoka area only needs to select the map data divided by using the division pattern in FIG. 5 and purchase the map data for the region 71.

Next, the method adopted when determining a specific division pattern is explained. Basically, the division pattern is determined by taking into consideration the typical daily life zone centered on a major city. The term "daily life zone" is used to refer to the range over which a person is likely to move while carrying on his daily life. For instance, it may be a range centered on a given city and reaching over to another city with a minimum specific level of traffic flow (vehicular traffic) between the two cities. This range may be determined by also taking into consideration the level of human traffic, the volume of shipment of goods and the like.

It is to be noted that a daily life zone cannot always be determined quantitatively and may sometimes need to be set based upon experience. Namely, the plurality of division patterns should be determined in an integrated manner by factoring in experience-based qualitative parameters in addition to quantitative parameters such as vehicle traffic volume, the level of human traffic and the volume of shipment of goods. In addition, the sizes of the regions (blocks) into which the entire map area is divided based upon the division patterns should be determined by taking into consideration the data volumes and the daily travel ranges.

In addition, the following point also needs to be considered. Let us assume that a given region (block) is set around a first major city by using a division pattern, and that there is another major city present near the boundary thereof. In such a case, the entire map area needs to be also divided with another division pattern based upon which the entire map area is divided into regions (blocks) including a region (block) centered on the second major city. In the example presented in FIG. 4, Shizuoka city is present in the region 62 centered on Nagoya city near the boundary thereof. Accordingly, another division pattern such as that shown in FIG. 5 is also selected so as to divide the entire map area into regions including the region 71 centered on Shizuoka city.

—Providing Map Data Via Communication Line—

Figure 6:
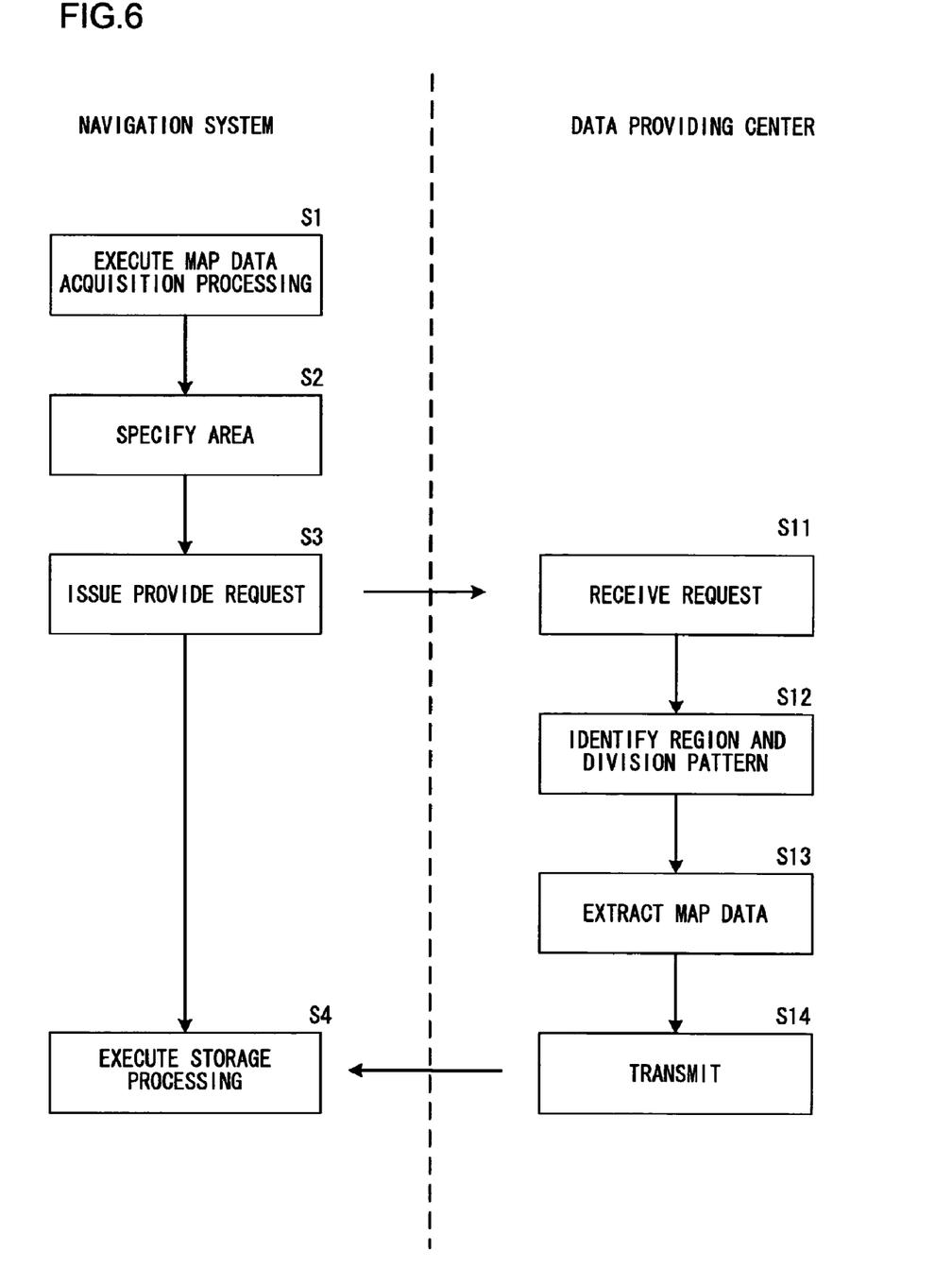
(FIG. 6) Information exchange between the navigation system and the data providing center related to the provision of map data.

As explained earlier, the map data can be received via the telephone network 5 as well in the embodiment. FIG. 6 shows how information is exchanged between the navigation system 1 and the data providing center 9 when the map data are provided via the telephone network. The processing at the navigation system 1 is executed by the control device 11 in conformance to a specific program. The processing at the data providing center 9 is executed by the server 6 in conformance to a specific program. The processing at the navigation system 1 in FIG. 4 starts as a menu "obtain map data" is selected in the menu screen or the like at the navigation system 1.

In step S1, the control device 11 at the navigation system 1 selects map data acquisition processing in response to the selection of the "obtain map data" menu by the user. In step S2, the control device 11 at the navigation system 1 prompts the user to specify the area for the map data acquisition. More specifically, it outputs an audio message "Specify area for map data acquisition" or displays a similar message on the monitor 18. The user enters the area, the map data of which he wishes to obtain, e.g., the name of a city, via the input device 17.

It is to be noted that the control device 11 may display a map of the entire nation at the monitor 18 so as to allow the user to specify the map data acquisition area on the map of the entire country. In addition, the control device 11 may display a list of regions into which the entire country is divided with each of the plurality of division patterns so as to allow the user to select a specific region among them.

In step S3, the control device at the navigation system 1 outputs a map data provide request to the data providing center 9. More specifically, it controls the communication device 4 constituted with a portable telephone via the communication interface 16 so as to call the phone number of the data providing center 9. Once the call is connected, the map data provide request is transmitted. The map data provide request is issued by transmitting a map data provide request command and information indicating the name of the city representing the target area. The communication between the navigation system 1 and the data providing center 9 is conducted by using a digital data communication function of the portable telephone.

In step S11, the server 6 at the data providing center 9 receives the map data provide request having been transmitted from the navigation system 1. In step S12, the server 6 at the data providing center 9 identifies a region substantially centered on the city bearing the name having been indicated in the map data provide request and also identifies the corresponding division pattern by referencing the map database 7. It is to be noted that information related to the regions resulting from divisions achieved with a plurality of pre-selected division patterns and map data corresponding to these regions are generated and stored in the map database 7.

In step S13, the server 6 at the data providing center 9 reads out the map data for the identified region from the map database 7. In step S14, the server 6 at the data providing center 9 transmits the regional map data having been read out in step S13 and information related to the identified division pattern to the navigation system 1.

In step S4, the control device 11 at the navigation system 1 executes map data storage processing. Namely, it stores the map data file having been transmitted into the non-volatile memory 12 and updates the file management table accordingly. It is to be noted that since the map data are managed in units of individual files each corresponding to one of the regions described above, the transmitted map data file only needs to be stored as it is.

—Updating Map Data—

As described earlier, the map data are managed in units of individual files each corresponding to a given region in the embodiment. Accordingly, the existing map data held at the navigation system 1 are updated by updating a specific file corresponding to a given region. The update data may be provided via a recording medium 2 or they may be provided via a communication line in the telephone network 5. The update data are provided as the latest map data file for the prefectures in that particular region. Accordingly, the map data can be updated by writing over the old map data file with the update data file having been provided.

The map data providing system achieved in the embodiment, which adopts the structure described above, realizes the following advantages.

(1) The entire map area 51 over which the map data are available are divided with a plurality of division patterns and a specific region over which map data are to be provided is determined. This allows the user to select an optimal region for which the map data best matching his daily life zone are to be provided. As a result, the user is able to obtain the minimum volume of map data he needs, which also best suit his particular needs, at low cost.

(2) In particular, a user residing near a boundary between two regions, in correspondence to which map data are provided in separate files in the related art, is able to obtain optimal map data best matching his particular daily life zone through a single recording medium. Thus, he does not need to incur unnecessary costs for map data acquisition and does not need to perform the tedious task of frequently having to switch recording media while driving his vehicle to run daily routines.

(3) Detailed map data over a specific target area can be obtained as needed at minimum cost.

(4) When the user relocates his residence to another area, the minimum volume of necessary map data, best suiting the location of the new residence, can be obtained.

(5) The map data corresponding to a specific region resulting from the division with the optimal division pattern can be obtained via a communication line such as the telephone network 5 as well, and consequently, the minimum volume of optimal map data can be obtained at low cost.

(6) Since the map data can be updated in units of individual regions resulting from the division described above, the latest map data can be obtained as necessary at low cost.

It is to be noted that while an explanation is given above in reference to the embodiment on an example in which two division patterns are used, the present invention is not limited to this example. The entire map area may be divided by using three or more division patterns. Namely, division patterns that will allow the map data to be provided in optimally divided regions in correspondence to users' needs should be selected.

While an explanation is given above in reference to the embodiment on an example in which the entire map area is divided into regions such as those shown in FIG. 3 and FIG. 4, the present invention is not limited to this example and the entire map area may be divided into smaller blocks. Optimal blocks into which the map entire area is to be divided should be determined by taking into consideration the daily life zone of the user who uses the navigation system 1.

While an explanation is given above in reference to the embodiment on an example in which the map data are managed in units of data files each corresponding to a specific region, the present invention is not limited to this example. For instance, the map data may be managed in units of data files each corresponding to a specific administrative subdivision such as a prefecture or a municipality within the region. In such a case, the map data corresponding to the region should be considered to be a collective body of these data files.

While an explanation is given above in reference to the embodiment on an example in which the map data are provided, the present invention may also be adopted when providing the search data. In addition, the search data may be conceptually regarded as a type of map data.

While an explanation is given above in reference to the embodiment on an example in which the navigation system 1 and the data providing center 9 are connected with each other via the telephone network 5, the present invention is not limited to this example and they may be connected with each other via the Internet or via a dedicated line.

While an explanation is given above in reference to the embodiment on an example in which the DVD drive device 14 is installed at the navigation system 1, the present invention is not limited to this example. The navigation system 1 may only include the nonvolatile memory 12 such as a hard disk, and the map data and the search data may all be obtained through communication. Alternatively, the navigation system 1 may include slot for an IC card or the like so as to receive update data for the search data in a removable memory such as an IC card.

While an explanation is given above in reference to the embodiment on an example in which the present invention is adopted in conjunction with a navigation system installed in a vehicle, the present invention is not limited to this example and may also be adopted in a portable navigation system. In addition, the present invention may be adopted to provide navigation via a portable telephone. In such a case, the sizes of the divided blocks or the division patterns should be determined so as to best suit a specific device model. In the case of a portable telephone with a navigation function, the portable telephone itself should be regarded as a navigation system.

While an explanation is given above in reference to the embodiment on an example in which the programs executed in the navigation system 1 and the server 6 are preinstalled in the individual apparatuses, the present invention is not limited to this example. For instance, the programs may be provided in recording media such as DVD-ROMs, CD-ROMs or the like. In such a case, the navigation system and the data providing center will each need to include a device capable of reading data from a recording medium. Alternatively, the programs may be provided via a transmission medium such as a communication line, a typical example of which is the Internet. In other words, the programs, converted to signals on carrier waves which transmits through transmission media, may be provided through transmission. Furthermore, the navigation system 1 in the map data providing system shown in FIG. 1 may be provided with the necessary program by the server 6

While an explanation is given above in reference to the embodiment on an example in which the present invention is adopted in a dedicated navigation system exclusively used in a vehicle, the present invention is not limited to this example and the control program for the navigation system 1 described earlier may be executed on a personal computer to enable the personal computer to function as a navigation system. Under such circumstances, the current position detection device 13 and the like should be connected to specific I/O ports or the like of the personal computer.

Figure 7:
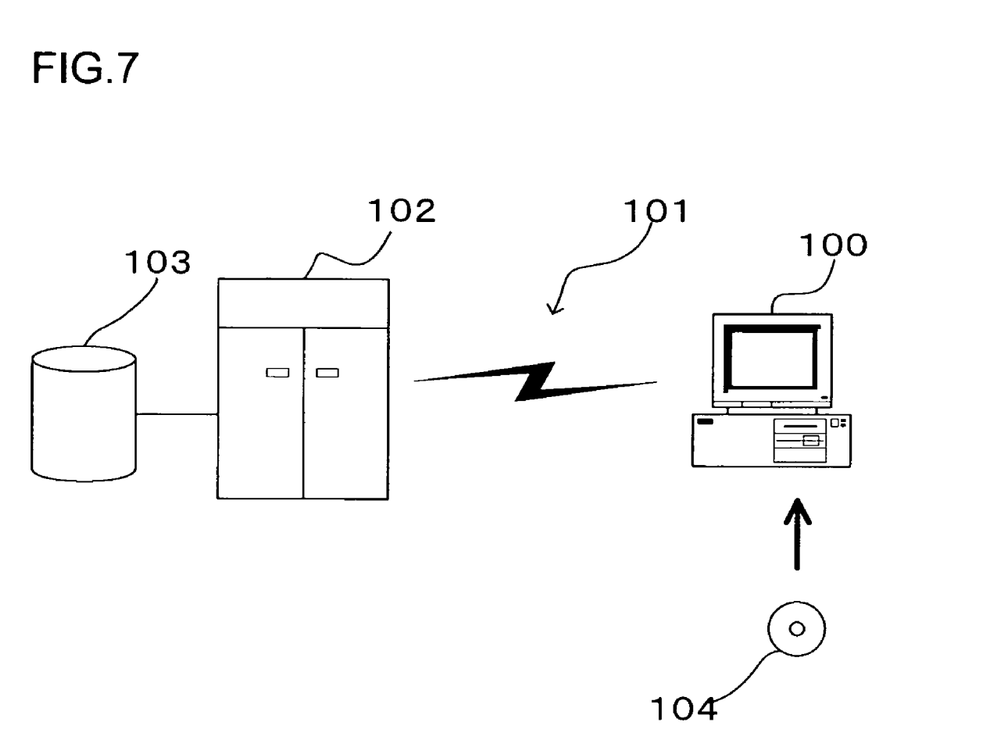

FIG. 7 shows how the program may be provided to a personal computer 100 in a recording medium such as a CD-ROM or through a data signal on the Internet or the like. While reference numeral 100 indicates a personal computer, the program may be provided to the navigation system 1 or the server 6 in a similar manner. The personal computer 100 acquires the program via a CD-ROM 104. The personal computer 100 is also capable of connecting with a communication line 101. A computer 102 is a server computer that provides the program stored in a recording medium such as a hard disk 103. The communication line 101 may be a communication network for Internet communication, personal computer communication or the like or it may be a dedicated communication line. The computer 102 reads out the program from the hard disk 103 and transmits the program to the personal computer 100 via the communication line 101. Namely, the program embodied as a data signal on a carrier wave is transmitted via the communication line 101. Thus, the program can be distributed as a computer-readable computer program product adopting any of various modes including a recording medium and a carrier wave.

While an explanation is given above in reference to the embodiment on an example in which the map data are managed in units of individual regions regardless of the data types, the present invention is not limited to this example. Namely, the different types of map data, i.e., the background data, the road data, the route search data and the route guidance data, may be separately managed, each in units of the individual regions.

While an explanation is given above in reference to the embodiment on an example in which the entire map area, which is divided into a plurality of regions, represents the entire nation of Japan, the present invention is not limited to this example and it may be adopted when dividing any country into a plurality of regions or blocks, or when dividing a continent or a given area into a plurality of blocks.

While the invention has been particularly shown and described with respect to a preferred embodiment and a variation thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:

Japanese Patent Application No. 2004-176684, filed Jun. 15, 2004.

The invention claimed is:

1. A map data providing apparatus for providing map data to be used in a navigation system in response to a request from a user, comprising:
   a map data storage device including a computer-readable medium that stores information related to each of blocks resulting from dividing an area, over which the map data are available, into a plurality of blocks by using each of a plurality of division patterns, and a plurality of sets of map data each in correspondence to each of the blocks resulting from the divisions achieved with the plurality of division patterns, the information related to each of the blocks being information that identifies a division pattern and the plurality of sets of map data having been prepared in advance; and
   a computer configured to obtain information related to a place from the user, reference the information related to each of the blocks stored in the map data storage device using the obtained information related to the place, identify a division pattern among the plurality of division patterns that achieves a block substantially centered on the place, obtain a set of map data in correspondence to a block resulting from a division by the identified division pattern from the plurality of sets of map data stored in the map data storage device, and output the obtained set of map data, wherein:
   the plurality of division patterns includes a first division pattern with which the area is divided into a plurality of first blocks and a second division pattern with which the area is divided into a plurality of second blocks;
   the area to be divided with the first division pattern is the same as the area to be divided with the second division pattern;
   the first blocks do not overlap each other and the second blocks do not overlap each other;
   each of the first blocks is different from each of the second blocks; and
   the computer is configured to reference the information related to each of the blocks including the plurality of the first blocks and the plurality of the second blocks, and identify a division pattern that achieves a block substantially centered on the place among the plurality of division patterns including the first division pattern and the second division pattern.

2. A map data providing apparatus according to claim 1, wherein:
   in the plurality of sets of map data stored in the map data storage device, the blocks resulting from the divisions achieved with the plurality of division patterns are determined by taking into consideration connections related to everyday life activities.

3. A map data providing apparatus according to claim 1, wherein:
   in the plurality of sets of map data stored in the map data storage device, the blocks resulting from the divisions achieved with the plurality of division patterns are determined by taking into consideration a vehicular traffic volume.

4. A map data providing apparatus according to claim 1, wherein:
   in the plurality of sets of map data stored in the map data storage device, sizes of the blocks resulting from the divisions achieved with the plurality of division patterns are determined by taking into consideration ranges over which users of the navigation system typically travel as part of daily routines.

5. A map data providing apparatus according to claim 1, wherein:
   in the plurality of sets of map data stored in the map data storage device, the plurality of division patterns include the first division pattern with which one of the first blocks centered on a first city is defined and the second division pattern with which one of the second blocks centered on a second city, present in the one of the first blocks closer to a boundary of the one of the first blocks, is defined.

6. A map data providing apparatus according to claim 1, wherein:
   the computer outputs a set of map data corresponding to a block divided into by the identified division pattern to be stored in a recording medium.

7. A map data providing apparatus according to claim 1, wherein:
   the computer outputs a set of map data corresponding to a block divided into by the identified division pattern to the navigation system via a communication line.

8. A map data providing apparatus according to claim 1, wherein:
   the computer outputs a set of map data corresponding to a block divided into by the identified division pattern as a set of map data for updating map data corresponding to the blocks which were previously provided.

9. A map data providing apparatus according to claim 1, wherein:
   the information related to the place includes a name of a city.

10. A map data providing apparatus according to claim 1, wherein each of the second blocks overlaps at least two of the first blocks.

* * * * *